Aug. 7, 1956   J. A. SAMUELSON   2,757,952
BALE HOOK
Filed Oct. 27, 1954

INVENTOR.
John A. Samuelson
BY
Sam J. Slotsky
ATTORNEY

United States Patent Office 2,757,952
Patented Aug. 7, 1956

2,757,952

BALE HOOK

John A. Samuelson, Alexandria, Minn.

Application October 27, 1954, Serial No. 465,101

1 Claim. (Cl. 294—26)

My invention pertains to a bale hook.

An object of my invention is to provide a bale hook which can easily penetrate into a bale of hay, or other bale, and whereby the bale can be lifted with the hook in the proper position, and whereby, after the bale is elevated to its deposited location, by merely releasing the hand grasp of the hook, the sharp portion of the hook will be automatically released.

A further object of my invention is to provide a simple arrangement wherein the hook can be conveniently worn on the hand, and which is made of relatively few parts so as to render the hook simple to manufacture.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1:
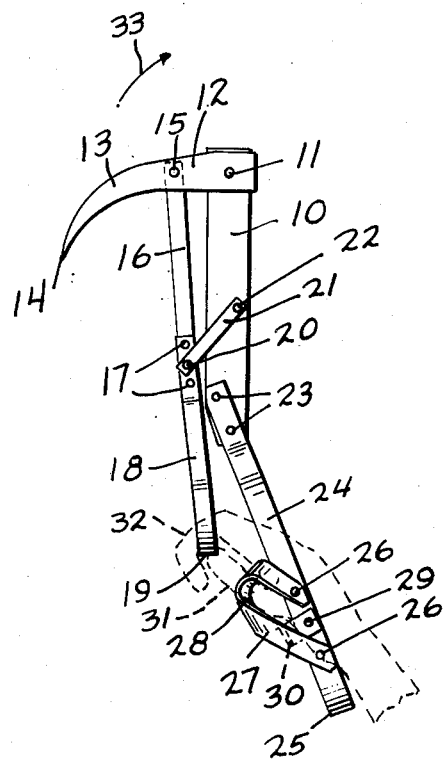
Figure 1 is a side view of the hook.
Figure 2:
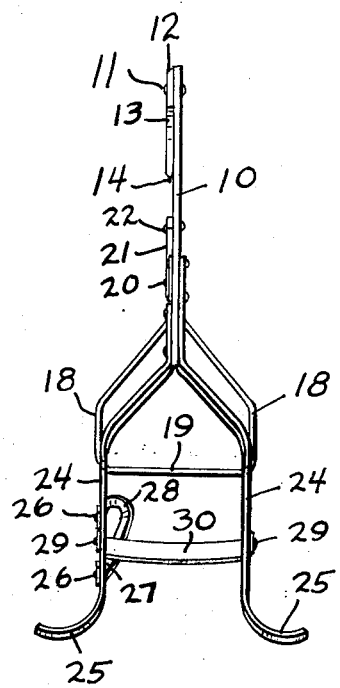
Figure 2 is a forward view of Figure 1.

My invention contemplates the provision of a bale hook which can be easily disengaged from the bale after the hook is used, as will be apparent from the following description, such an arrangement being desired since the normally rigid bale hooks, after the bale is raised onto a wagon for instance, it is usually difficult for the operator to disengage the hook therefrom, the present invention eliminating this difficulty.

I have used the character 10 to designate a flat bar to which is pivoted at 11 a hook member 12 having the arcuate portion 13 and terminating in the point 14.

Pivoted at 15 to the member 12 is a further bar 16 which is secured at 17 to a hand grasping member having the side portions 18 and the transverse portion 19.

Pivotally attached at 20 to the members 18 and 16 is a link 21 which is pivotally attached at 22 to the member 10. Rigidly secured at 23 to the member 10 are the members 24 terminating in the curled portions 25, and attached at 26 to one of the members 24 is a fairly flexible strap member 27 having the rounded or arcuate thumb-receiving portion at 28. Attached at 29 to the side members 24 is a slightly curved strap 30.

The hook is used in the following manner. As shown in Figure 1, the thumb, indicated by the character 31, is inserted through the arcuate or looped portion 28 of the strap 27, and the hand will then fall naturally between the side portions 24, with the lower part of the palm or wrist bearing against the strap member 30. All of the other fingers of the hand, which are indicated by the character 32, will tightly grasp the crosspiece 19 of the members 18 etc., which will in effect cause the hook to occupy the position shown in Figure 1, the leverage between the pivoting points 20 and 22 of the link 21 being considerably reduced so that when the point 14 of the hook is engaged in a bale, the hook will remain in this fixed position without any tendency of dislodging the same, due to the effect of the reduced leverage.

It will be understood that if a bale is raised from a lower position, the arrangement will appear in the reverse manner as shown in Figure 1, Figure 1 showing the approximate position of the hook after the bale has been raised.

As soon as the bale is deposited in its raised position, the fingers 32 are released from the transverse portion 19, whereby a slight pulling effect downwardly will cause the hook members 12 and 13 to freely pivot in the direction of the arrow 33, whereby the hook will then be easily released from the bale, ready for the next similar operation.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A bale hook comprising a strap member, a hand engaging member including a pair of further spaced strap members attached to said strap member, and adapted to receive a hand therebetween, a hook member pivotally attached to said strap member, a finger grasping member pivotally attached to said hook member, said finger grasping member including a transverse bar portion whereby the fingers of the hand can receive the same, a link pivotally secured to said strap member and said finger grasping member, releasing of said transverse bar portion causing release of said hook member, a thumb-engaging looped member attached to one of said further strap members.

References Cited in the file of this patent

UNITED STATES PATENTS

| 920,700 | Waterman | May 4, 1909 |
| 922,136 | Groves | May 18, 1909 |
| 1,180,196 | Schepp | Apr. 18, 1916 |
| 2,628,857 | Nelson | Feb. 17, 1953 |